(12) United States Patent
Yu et al.

(10) Patent No.: US 10,808,715 B2
(45) Date of Patent: Oct. 20, 2020

(54) HEAT DISSIPATION FAN

(71) Applicant: Acer Incorporated, New Taipei (TW)

(72) Inventors: Shun-Ta Yu, New Taipei (TW);
Wen-Neng Liao, New Taipei (TW);
Yu-Ming Lin, New Taipei (TW);
Cheng-Yu Cheng, New Taipei (TW);
Cheng-Wen Hsieh, New Taipei (TW)

(73) Assignee: Acer Incorporated, New Taipei (TW)

( * ) Notice: Subject to any disclaimer, the term of this patent is extended or adjusted under 35 U.S.C. 154(b) by 97 days.

(21) Appl. No.: 16/168,855

(22) Filed: Oct. 24, 2018

(65) Prior Publication Data
US 2019/0128279 A1 May 2, 2019

(30) Foreign Application Priority Data

Oct. 26, 2017 (TW) .............................. 106136838 A

(51) Int. Cl.
| | |
|---|---|
| *F04D 29/28* | (2006.01) |
| *F04D 29/30* | (2006.01) |
| *F04D 29/42* | (2006.01) |
| *G06F 1/20* | (2006.01) |
| *F04D 29/66* | (2006.01) |
| *F04D 25/06* | (2006.01) |

(52) U.S. Cl.
CPC ........... *F04D 29/281* (2013.01); *F04D 29/30* (2013.01); *F04D 29/424* (2013.01); *F04D 25/0613* (2013.01); *F04D 29/666* (2013.01); *F05D 2230/54* (2013.01); *F05D 2240/304* (2013.01); *F05D 2250/182* (2013.01); *G06F 1/20* (2013.01)

(58) Field of Classification Search
CPC ...... F04D 29/424; F04D 29/30; F04D 29/281; G06F 1/203; G06F 1/20; F05D 2230/54; F05D 2240/304; F05D 2250/182
See application file for complete search history.

(56) References Cited

U.S. PATENT DOCUMENTS

| | | | | |
|---|---|---|---|---|
| 1,059,161 | A | * | 4/1913 | Huguenin .................. 416/235 |
| 2,222,787 | A | * | 11/1940 | Stadler .................. F04D 29/281 |
| | | | | 416/214 R |
| 7,713,030 | B2 | * | 5/2010 | Tanahashi ............... F04D 29/30 |
| | | | | 416/236 R |
| 2007/0116576 | A1 | | 5/2007 | Chang et al. |
| 2010/0221097 | A1 | | 9/2010 | Dittmar et al. |

(Continued)

FOREIGN PATENT DOCUMENTS

| | | |
|---|---|---|
| CN | 1573124 | 2/2005 |
| CN | 1982727 | 6/2007 |

(Continued)

OTHER PUBLICATIONS

"Bevelled Blade Tips," accessed Apr. 2018, Available at: http://noctua.at/en/bevelled-blade-tips.

*Primary Examiner* — Igor Kershteyn
(74) *Attorney, Agent, or Firm* — JCIPRNET

(57) ABSTRACT

A heat dissipation fan including a hub and a plurality of metal fan blades disposed all around the hub. Each of the metal fan blades has a first end and a second end opposite to each other, wherein the first end is connected to the hub, and the metal fan blade has a flap wing at the second end. An angle is included between the flap wing and a surface of the metal fan blade.

12 Claims, 7 Drawing Sheets

(56) References Cited

U.S. PATENT DOCUMENTS

| | | | | |
|---|---|---|---|---|
| 2012/0114512 A1* | 5/2012 | Lofy | ..................... | F04D 29/281 |
| | | | | 417/410.1 |
| 2014/0133988 A1* | 5/2014 | Son | ..................... | F04D 29/282 |
| | | | | 416/189 |
| 2015/0267715 A1* | 9/2015 | Lee | ..................... | F04D 29/422 |
| | | | | 415/214.1 |
| 2016/0290355 A1* | 10/2016 | Lin | ..................... | F04D 29/023 |
| 2018/0058467 A1* | 3/2018 | Lin | ..................... | F04D 29/281 |
| 2018/0112676 A1* | 4/2018 | Yang | ..................... | F04D 29/282 |

FOREIGN PATENT DOCUMENTS

| | | |
|---|---|---|
| CN | 101338768 | 1/2009 |
| CN | 201730862 | 2/2011 |
| CN | 201771863 | 3/2011 |
| CN | 103388591 | 11/2013 |
| CN | 103982464 | 8/2014 |
| CN | 104033419 | 9/2014 |
| CN | 107191411 | 9/2017 |
| JP | 2007138824 | 6/2007 |
| TW | 339816 | 9/1998 |
| TW | 450481 | 8/2001 |
| TW | 200720551 | 6/2007 |
| TW | 200939938 | 9/2009 |
| TW | 201418580 | 5/2014 |
| TW | M502749 | 6/2015 |
| TW | M512155 | 11/2015 |
| TW | M525398 | 7/2016 |
| TW | M529763 | 10/2016 |

* cited by examiner

HEAT DISSIPATION FAN

CROSS-REFERENCE TO RELATED APPLICATION

This application claims the priority benefit of Taiwan application serial no. 106136838, filed on Oct. 26, 2017. The entirety of the above-mentioned patent application is hereby incorporated by reference herein and made a part of this specification.

BACKGROUND

1. Field of the Invention

The invention generally relates to a fan, and particularly to, a heat dissipation fan.

2. Description of Related Art

With advances in technology, portable electronic devices, such as laptops and smartphones, have been frequently used in daily life. At the same time, in order to meet users' demands for small size and high efficiency, in addition to improving the aforesaid goals of the electronic devices, how to handle heat generated during the operation of the electronic devices is also a major issue for improving the operation efficiency of the electronic devices. Therefore, heat dissipation modules or heat dissipation components, such as heat dissipation fans, are typically configured inside the electronic devices for assisting in dissipating the heat generated during the operations of the electronic devices to the outside of the electronic devices.

Take a centrifugal fan for an example, a fabrication method of the centrifugal fan typically adopts plastic injection, metal stamping or sheet metal stamping to integrally form a hub and a plurality of fan blades. When a material of the fan blades is plastic, the fan blades as being restricted by material properties are difficult to be reduced in thickness, and thus a distance between two fan blades is smaller, thereby lowering the heat dissipation efficiency of the fan. Therefore, in order to increase air pressure and airflow volume of the centrifugal fan, the only way is to increase a rotational speed of the fan, but this also results in the increase of noise generation as the rotational speed of the fan increases.

Therefore, how to improve the relevant structures of the fan to enhance the heat dissipation efficiency thereof is, in fact, an issue to be solved by those skilled in the art.

SUMMARY

The invention is directed to a heat dissipation fan, of which a plurality of metal fan blades each has at least one flap wing being formed for reducing whirlpool formation and increasing a volume of airflow during an operation of the heat dissipation fan, so that the overall effectiveness of heat dissipation fan is enhanced.

The heat dissipation fan of the invention includes a hub and a plurality of metal fan blades. The metal fan blades are disposed all around the hub, and each of the metal fan blades has a first end and a second end opposite to each other, wherein the first end is connected to the hub, the second end has at least one flap wing, and an angle is included between the flap wing and a surface of the metal fan blade.

In view of the above, the heat dissipation fan by being configured with a plurality of metal fan blades while forming at least one flap wing at an end of each of the metal fan blades enables an angle to be included between the flap wing and a surface of the corresponding metal fan blade; and thus, during the operation of the heat dissipation fan, the flap wings can effectively reduce a disturbance of the surrounding air due to the rotation of the fan blades, and can also reduce whirlpool formation while increasing the volume of airflow, thereby providing effects of enhancing operational efficiency and noise reduction.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
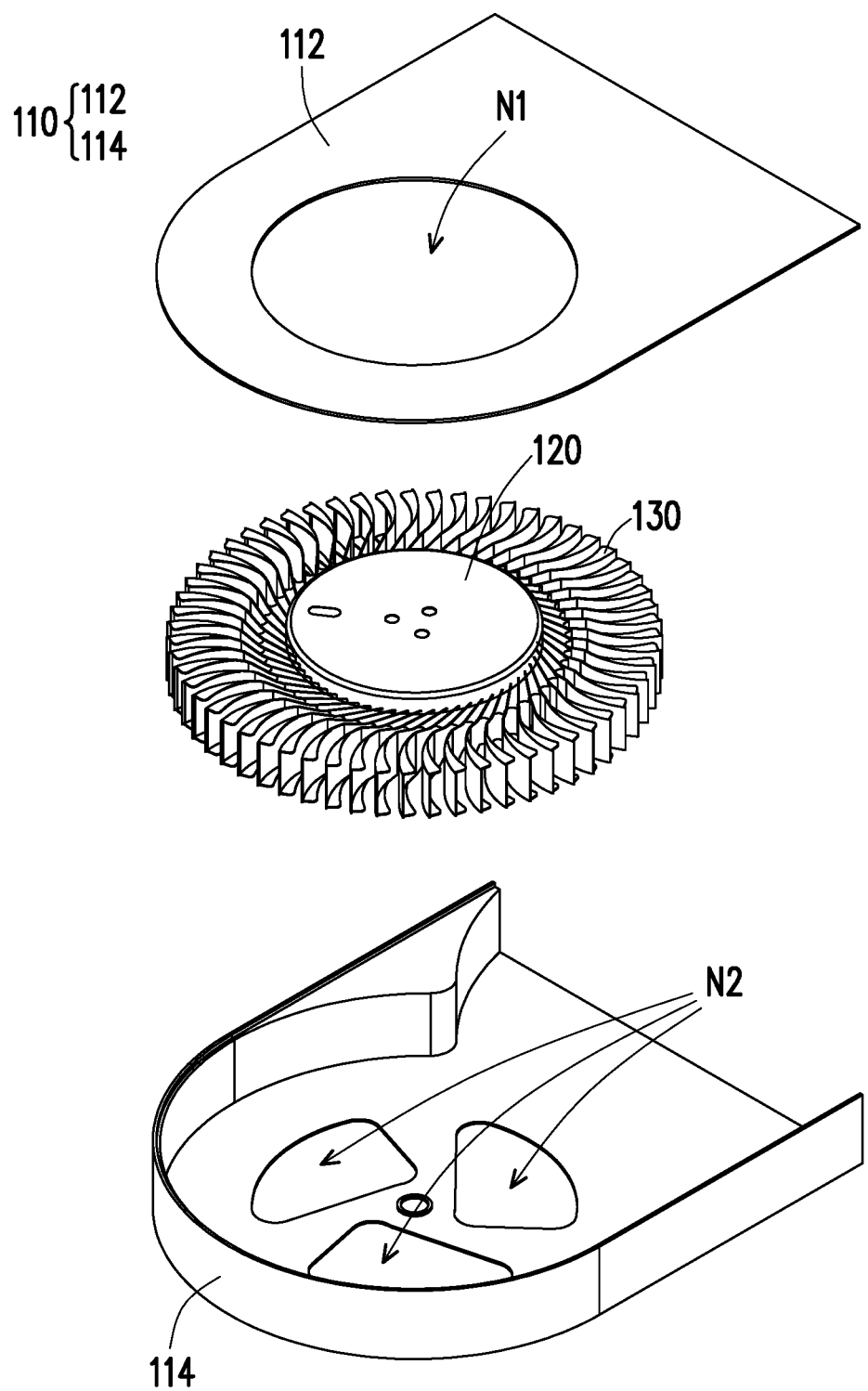
FIG. 1 is an exploded view of heat dissipation fan according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
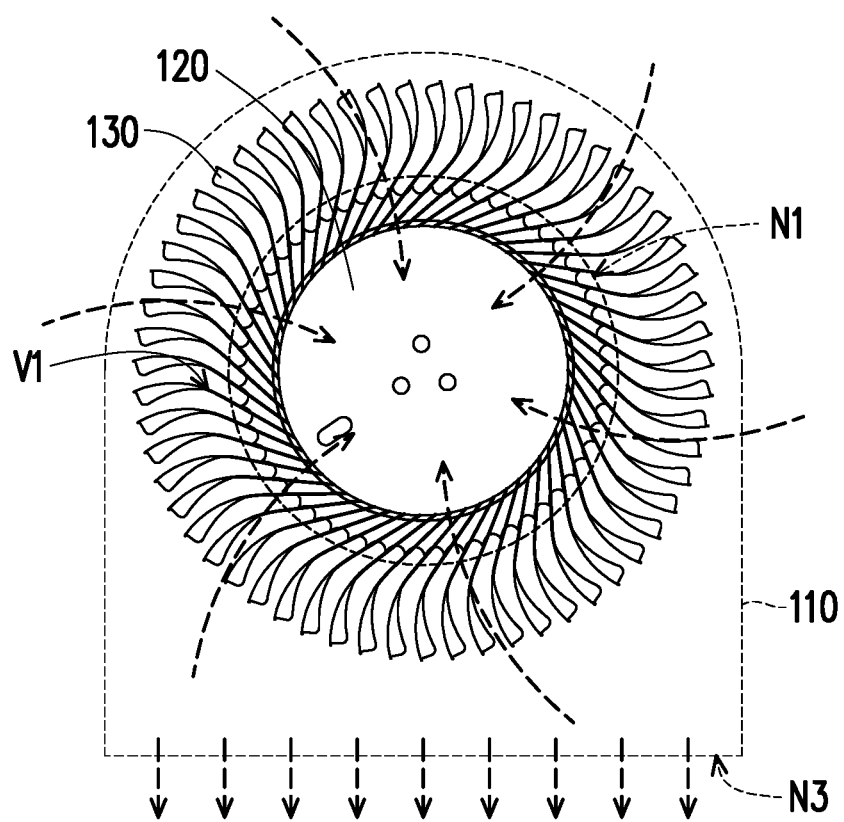
FIG. 2 is a top view of the heat dissipation fan of FIG. 1.
Figure 3:
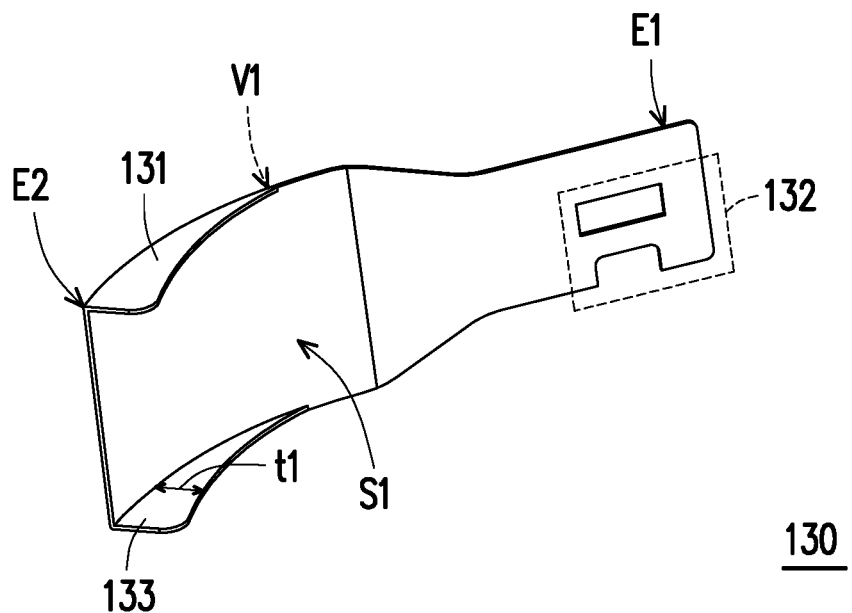
FIG. 3 is a schematic diagram of a plurality of fan blades of the heat dissipation fan of FIG. 1.

FIG. 1 is an exploded view of heat dissipation fan according to an embodiment of the invention. FIG. 2 is a top view of the heat dissipation fan of FIG. 1. FIG. 3 is a schematic diagram of a plurality of fan blades of the heat dissipation fan of FIG. 1. Referring to FIG. 1 through FIG. 3 at the same time, in the present embodiment, the heat dissipation fan 100 is, for example, a centrifugal fan, which includes a casing 110, a hub 120 and a plurality of metal fan blades 130, wherein the casing 110 is constituted of components 112, 114 and forms an accommodation space for accommodating the hub 120 and the metal fan blades 130, and the casing 110 has air inlets N1, N2 and an air outlet N3. The metal fan blades 130 are disposed all around the hub 120, and a power source (e.g., motor, which is not shown)

is used to drive the hub 120 so as to enable the metal fan blades 130 to rotate along the hub 120, so that ambient air is sucked into the heat dissipation fan 100 from the air inlets N1, N2 and is blown out from the air outlet N3. Herein, a heat source of an electronic device (not shown), for example, is disposed at the air outlet N3, or may transfer heat to a fin set disposed at the air outlet N3 through a heat pipe, and thus the heat dissipation fan 100 is adaptive for providing heat dissipation to the heat source of the electronic device. Herein, take FIG. 2 as an example, dotted arrows show the flow of air.

A material of the hub 120 is plastic or die casting metal, and thus the hub 120 can be combined with the metal fan blades 130 by means of injection molding (plastic) or die casting (metal). Furthermore, the metal fan blades 130 can be placed in a mold (not shown) after being fabricated, and then the plastic or the metal in a liquid state after being heated can be poured into the mold and wrap the metal fan blades 130, so that the resulting hub 120 can be formed to be fixed with the metal fan blades 130. In another embodiment, the hub 120 and the metal fan blades 130 can be separately formed, but respectively reserved with bonding structures (such as engagement grooves and engagement protrusions that are corresponded to each other), so that the metal fan blades 130 can later be one-by-one engaged with the hub 120. However, the embodiments of the invention are not limited thereto.

In the present embodiment, since the metal fan blades 130 can be individually fabricated and then assembled to the hub 120, the metal fan blades 130 can be reduce in thickness with a ductility of the metal material, and thus spaces between every metal fan blades 130 also increase, thereby increasing a volume of airflow generated when the hub 120 drives the metal fan blades 130 into rotation. On the other hand, reducing the thickness of the metal fan blades 130 may also allow the heat dissipation fan 100 to be assembled with more numbers of the metal fan blades 130, and thus increases the volume of airflow generated during the rotation. Therefore, when the heat dissipation fan of the present embodiment is applied to an electronic device, airflow can be provided to the interior of the electronic device, such that the airflow can carry away heat generated by the heat source and dissipate the heat to the outside of the electronic device, thereby effectively improving the heat dissipation performance.

Referring to FIG. 1 and FIG. 3, it is to be noted that, each of the metal fan blades 130 has a first end E1 and a second end E2 opposite to each other and at least one flap wing, wherein the first end E1 is connected to or assembled to the hub 120, and the flap wing has an angle included between the second end E2 and a surface S1 of the metal fan blade 130. Herein, each of the metal fan blades 130 has a combining portion 132 (opening and dent) located at the first end E1 for combining or assembling with the hub 120.

In detail, each of the metal fan blades 130 of the present embodiment has a pair of flap wings 131, 133 respectively disposed on upper and lower opposite sides of the second end E2 and are respectively perpendicular to the surface S1. Moreover, the surface S1 of each of the metal fan blades 130 has an arc-shaped bending profile, and the flap wings 131, 133 are located at edges of the arc-shaped bending profile. In other words, a turnover point V1 of the arc-shaped bending profile is located outside the range of the air inlet N1 of the casing 110 (take the component 112 of FIG. 2 as an example), the flap wings 131, 133 substantially start to extend from the turnover point V1, and a width t1 of the flap wings 131, 133 (that is, a dimension of the flap wings 131, 133 extending from the surface S1) gradually increases from the first end E1 towards the second end E2.

Herein, the rotation direction of the hub 120 (and the metal fan blades 130) in the heat dissipation fan 100 is not particularly limited. Take FIG. 2 for an example, when the hub 120 and the metal fan blades 130 are rotating in a clockwise direction, the flap wings 131, 133 are substantially considered to have a swept-back design with respect to the rotation direction of the heat dissipation fan 100, and thus whirlpool formation at the flap wings 131, 133 can be reduced, thereby enabling the heat dissipation fan 100 to be lowered in windage and noise. On the contrary, when the hub 120 and the metal fan blades 130 are rotating in a counter-clockwise direction, the flap wings 131, 133 are substantially considered to have a rotation direction with respect to the rotation direction of the heat dissipation fan 100, and thus the flap wings 131, 133 can provide the metal fan blades 130 with wind capturing ability during the operation, thereby effectively increasing the air volume. As such, the metal fan blades 130 of the present embodiment, with the influence of the flap wings 131, 133, are able to provide the required effects regardless of rotating in any direction.

Figure 4A:
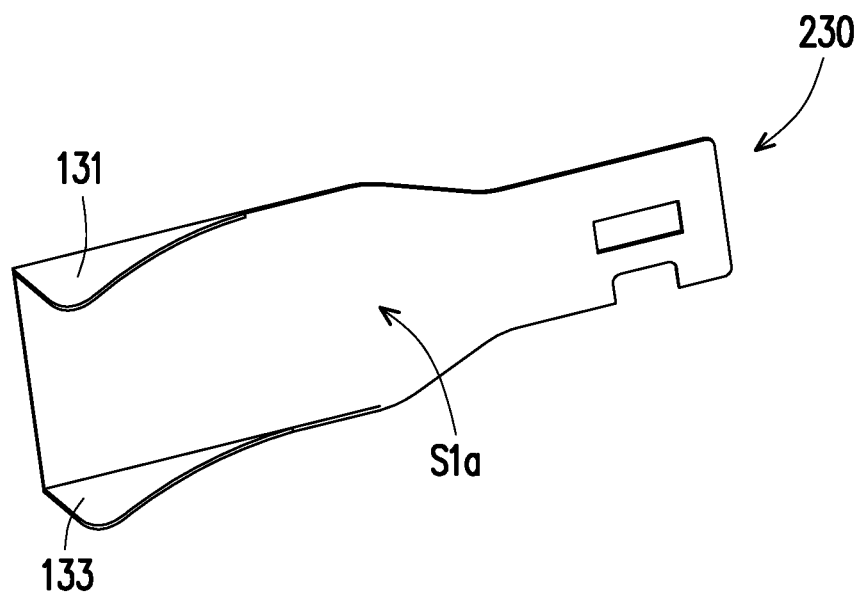
FIG. 4A illustrates a schematic blade structural diagram of a metal fan blade according to another embodiment of the invention.

FIG. 4A illustrates a schematic blade structural diagram of a metal fan blade according to another embodiment of the invention. Referring to FIG. 4A, a difference from the previous embodiment resides in that, the metal fan blade 230 of the present embodiment is substantially a flat-plate component, namely, the surface S1a is a flat surface, which also have the flap wings 131, 133, and may all be made directly from a same metal plate by means of stamping and bending.

Figure 4B:
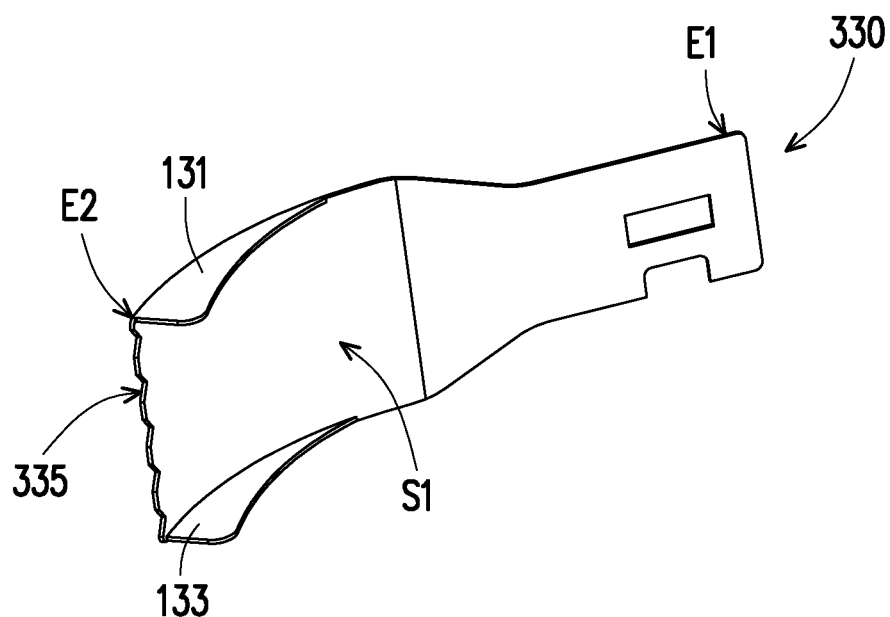
FIG. 4B illustrates a schematic blade structural diagram of a metal fan blade according to another embodiment of the invention.

FIG. 4B illustrates a schematic blade structural diagram of a metal fan blade according to another embodiment of the invention. Referring to FIG. 4B, differences from the previous embodiment reside in that, the metal fan blade 330 further has a broken blade edge 335 at the second end E2, and the flap wings 131, 133 are respectively adjacent to the broken blade edge 335, namely, the flap wings 131, 133 are connected to two opposite sides of the broken blade edge 335. Herein, the broken blade edge 335 is simultaneously formed with the flap wings 131, 133 as the metal fan blade 330 is made from a piece of sheet metal by means of stamping and bending. The broken blade edge 335 at the end of the metal fan blade 330 enables the metal fan blade 330 to disperse and weaken the whirlpool formed at the end (second end E2), and thus, similar to the effect provided by the flap wings 131, 133 in the swept-back design, the broken blade edge 335 of the present embodiment can effectively lowering the whirlpool formation and the windage, thereby achieving noise reduction while enhancing fan performance. Herein, the profile of the broken blade edge 335 is not particularly limited.

Figure 5:
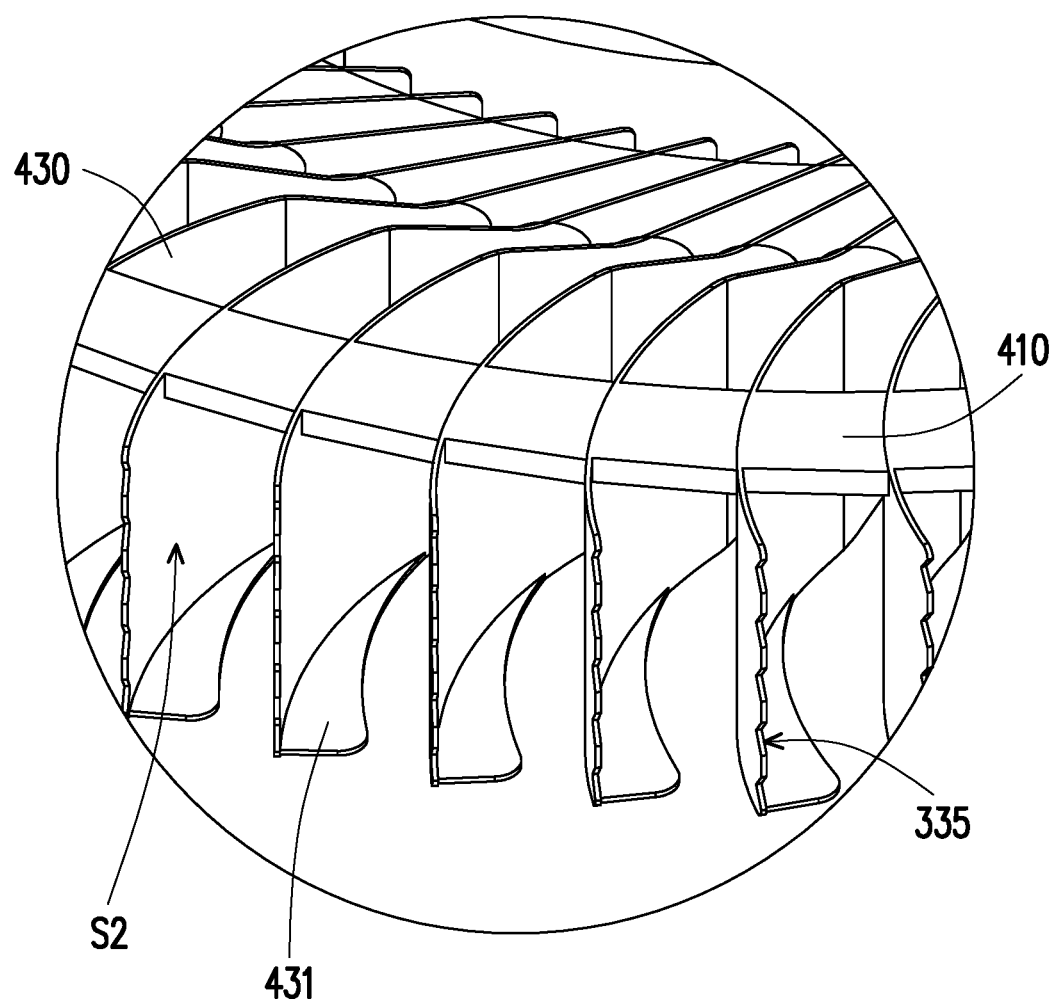
FIG. 5 illustrates a partial enlarged diagram of a heat dissipation fan according to another embodiment of the invention.

FIG. 5 illustrates a partial enlarged diagram of a heat dissipation fan according to another embodiment of the invention. Referring to FIG. 5, in the present embodiment, the heat dissipation fan 400 further includes an auxiliary structure 410 connected to the plurality of metal fan blades 430. Herein, the auxiliary structure 410 is fabricated by a method similar to that of the hub 120, such that it can be formed and combined with the metal fan blades 430 by means of injection molding (plastic) or stamping (metal), and thus the auxiliary structure 410 and the metal fan blades 430 can an integrally formed structure. In the present embodiment, the auxiliary structure 410 is disposed at an upper edge of the surface S2 of the metal fan blade 430, so that the flap wing 431 is only disposed at a lower edge of the surface S2 of the metal fan blade 430. As a result, in addition to retaining the previously mentioned effects provided by the flap wings, the auxiliary structure 410 further provides sufficient structural support to the metal fan blades 430, and thus the blade thickness and the appearance of the metal fan blades 430 can be further improved or optimized with the ductility of the metal material.

Figure 6:
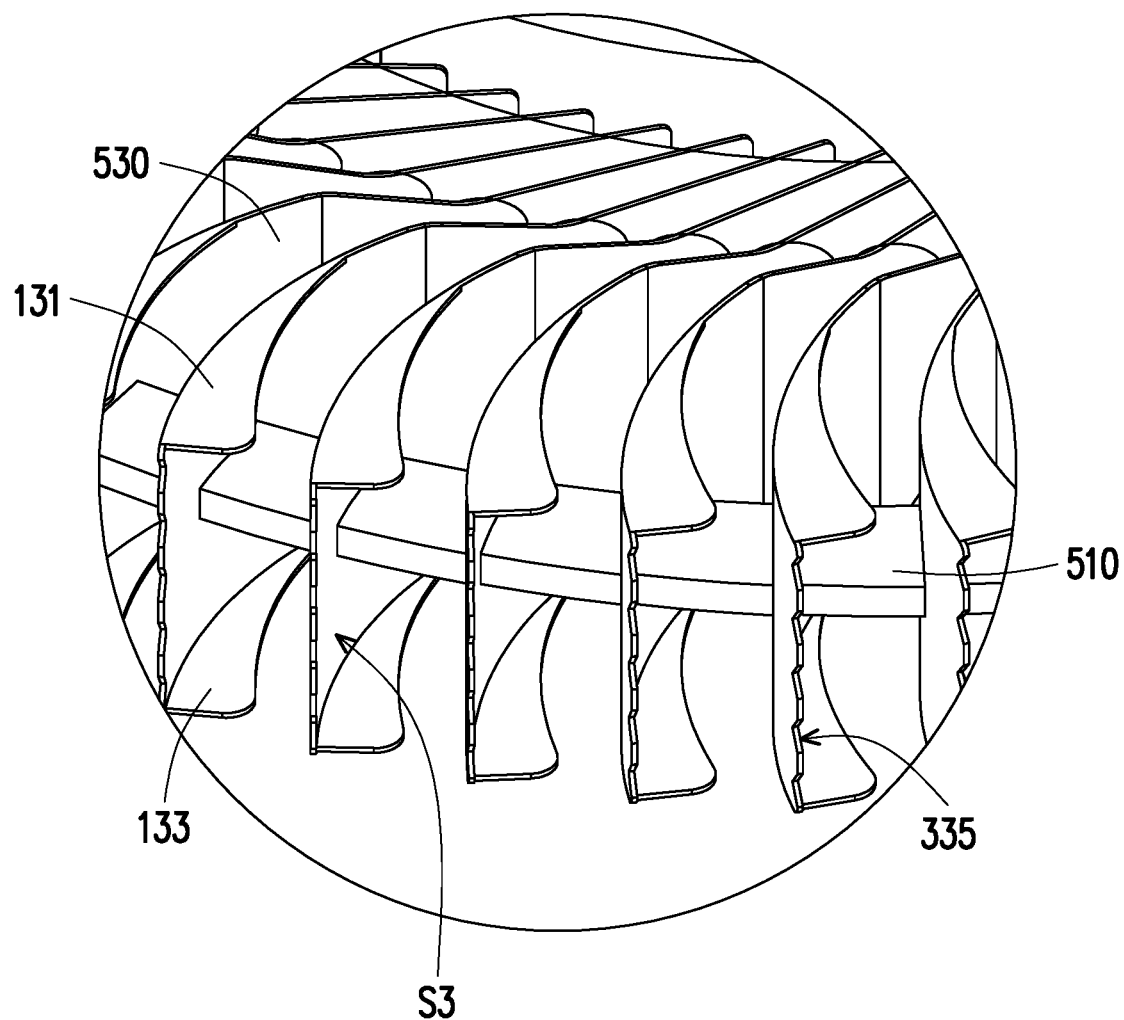
FIG. 6 illustrates a partial enlarged diagram of a heat dissipation fan according to another embodiment of the invention.

FIG. 6 illustrates a partial enlarged diagram of a heat dissipation fan according to another embodiment of the invention. Different from FIG. 5, the auxiliary structure 510 of the present embodiment is disposed at the center of the surface S3 of the metal fan blades 530 so as to penetrate through and connect (string together) the plurality of metal fan blades 530. Herein, in addition to providing the connections between the metal fan blades 530 and the support through the use of the auxiliary structure 510, the metal fan blades 530 can also retain the original flap wings 131, 133.

Figure 7A:
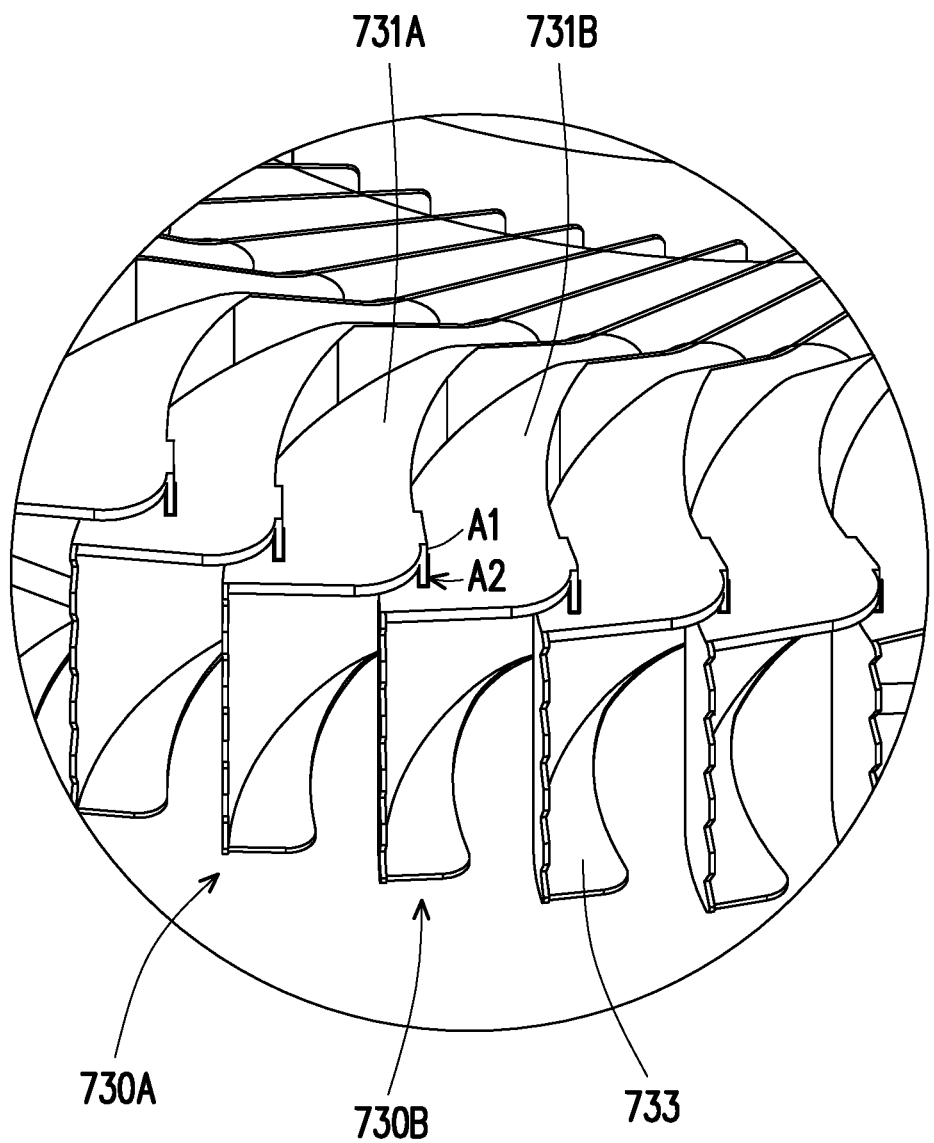
FIG. 7A and FIG. 7B respectively illustrate partial enlarged diagrams of a heat dissipation fan according to different embodiments of the invention.
Figure 7B:
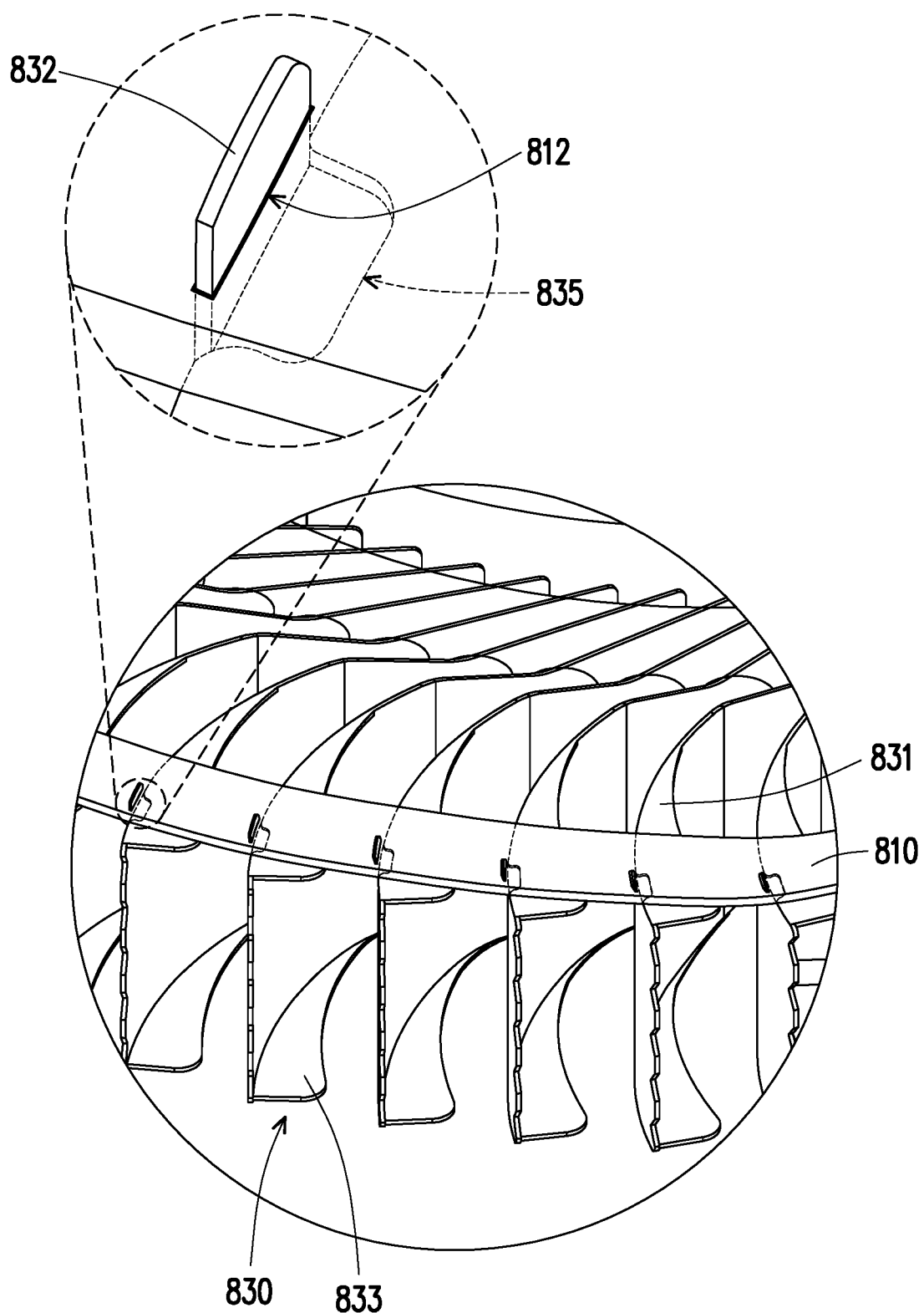

FIG. 7A and FIG. 7B respectively illustrate partial enlarged diagrams of a heat dissipation fan according to different embodiments of the invention. Referring to FIG. 7A, in the present embodiment, two adjacent metal fan blades 730A, 730B (take two adjacent ones for an example) are connected with each other to form an auxiliary structure via the flap wings 731A, 731B at the same sides, so that the metal fan blades 730A, 730B can retain the previously mentioned effects provided by the flap wings, and thus can enhance a structural integrity thereof. As shown in FIG. 7A, the metal fan blade 730A is configured with a lug A1 at an end edge of the flap wing 731A, while the metal fan blade 730B is configured with a lug hole A2 at a junction between the flap wing 731B and the surface S4, and thus the flap wing 731A can be stacked onto the flap wing 731B by engaging the lug A1 into the lug hole A2, thereby finishing a connection action between the metal fan blades 730A, 730B (the lug A1 being engaged into the lug hole A2 can further be bent to clamp the flap wing 731B to enhance a connection strength between the flap wings 731A, 731B). At the same time, the metal fan blades of the heat dissipation fan can all be one-by-one stacked and sequentially engaged together in the same way as the flap wings 731A, 731B. Certainly, the aforementioned engagement structures (lug A1 and lug hole A2) can also be configured at the flap wing 733 located at the lower edge of the metal fan blade.

Referring to FIG. 7B, different from the above, the metal fan blade 830 has a lug 832, configured on a flap wing 831, wherein the metal fan blade 830 is, for example, being stamped to form the lug 832 (and correspondingly form an opening 835 on a flap wing 831) before the metal fan blade 830 is being bent from a plate-shape into forming the flap wings 831, 835 (and make the opening 835 prominent). Moreover, the heat dissipation fan further includes an auxiliary structure 810, such as a ring-shaped plate, having a plurality of openings 812 configured thereon; thus, by correspondingly engaging the lugs 832 into the openings 812, the auxiliary structure 810 can be stacked and fixed onto the flap wings 831, thereby completing the structure feature of using the auxiliary structure 810 to connect and string together all the metal fan blades 830. Similarly, after the lugs 832 are engaged into the openings 812, the remaining parts of the metal fan blades can further be bent to clamp the auxiliary structure 810. Herein, relevant structures are further enlarged in order to facilitate identification.

In addition, the present embodiment only illustrates the lugs 832 and the openings 835 on the flap wings 831 as an example; similar structures can also be formed on the flap wings 833 so that the auxiliary structure 810 can be assembled at the bottom surfaces of the flap wing 833 and can also achieve the effect of connecting all the metal fan blades 830 together, and the details are not to be repeated.

In summary, in the embodiments of the invention, the heat dissipation fan by being configured with a plurality of metal fan blades the heat dissipation fan by being configured with a plurality of metal fan blades while forming at least one flap wing at an end of each of the metal fan blades enables an angle to be included between the flap wing and a surface of the corresponding metal fan blade; and thus, during the operation of the heat dissipation fan, the flap wings can effectively reduce a disturbance of the surrounding air due to the rotation of the fan blades, and can also reduce whirlpool formation while increasing the volume of airflow, thereby providing effects of enhancing operational efficiency and noise reduction.

Herein, the flap wings can collaborate with the auxiliary structure to enable the metal fan blades to retain the effects provided by the flap wings while enhancing the overall structure integrity of the metal fan blades with the support of the auxiliary structure, and thus the metal fan blades with the material properties (such as ductility) thereof can further be improved in thickness and appearance. Moreover, the auxiliary structure may also connect the metal fan blades together by engaging the flap wings with each other.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heat dissipation fan, comprising:
a hub; and
a plurality of metal fan blades, disposed all around the hub, each of the metal fan blades having a first end and a second end opposite to each other, wherein the first end is connected to the hub, the second end is distal and separated from the hub and has a pair of flap wings, and an angle is included between each of the flap wings and a surface of the metal fan blade, each of the flap wings extending from a first metal fan blade of the plurality of metal fan blades toward a second metal fan blade of the plurality of metal fan blades to maintain a gap between each of the flap wings and the second metal fan blade, and the first metal fan blade being adjacent to the second metal fan blade,
wherein each of the metal fan blades further has a broken blade edge located at the second end, and the flap wings are adjacent to the broken blade edge,
the pair of flap wings are connected at two opposite sides of the broken blade edge.

2. The heat dissipation fan as recited in claim 1, wherein the metal fan blade, the broken blade edge and the flap wings are formed by stamping and being a piece of sheet metal.

3. The heat dissipation fan as recited in claim 1, wherein each of the flap wings appears to have a swept-back design with respect to a rotation direction of the heat dissipation fan.

4. The heat dissipation fan as recited in claim 1, wherein each of the flap wings appears to have a forward-swept design with respect to a rotation direction of the heat dissipation fan.

5. The heat dissipation fan as recited in claim 1, wherein the flap wing and the surface of the metal fan blade are perpendicular to each other.

6. The heat dissipation fan as recited in claim 1, wherein the surface of the metal fan blade has an arc-shaped bending profile, and the flap wings are located at the arc-shaped bending profile.

7. The heat dissipation fan as recited in claim 1, wherein a dimension of the flap wings extending from the surface of the metal fan blade gradually increases from the first end towards the second end.

8. The heat dissipation fan as recited in claim 1, further comprising an auxiliary structure penetrating through and connected with the metal fan blades.

9. The heat dissipation fan as recited in claim 1, further comprising an auxiliary structure connected with the metal fan blades and being integrally formed with the metal fan blades.

10. The heat dissipation fan as recited in claim 1, wherein the flap wings of two adjacent metal fan blades are connected with each other to form an auxiliary structure.

11. The heat dissipation fan as recited in claim 1, being a centrifugal fan.

12. The heat dissipation fan as recited in claim 1, further comprising a casing having an air inlet, wherein the hub and the metal fan blades are assembled within the casing, the surface of each of the metal fan blades has an arc-shaped bending profile, and a turnover point of the arc-shaped bending profile is located outside a range of the air inlet.

* * * * *